Patented June 29, 1937

2,085,474

UNITED STATES PATENT OFFICE 2,085,474

MONOHALOGENATED UNSATURATED KETONES CONTAINING A STEROL NUCLEUS

Leopold Ruzicka, Zurich, Switzerland, assignor to the firm of Society of Chemical Industry in Basle, Basel, Switzerland No Drawing. Application September 8, 1936, Serial No. 99,859. In Switzerland October 24, 1935

4 Claims. (Cl. 260—131)

By causing mild agents which bind hydrogen halide to react with dihalides of 3-keto-$\Delta^{5,6}$-unsaturated compounds containing a sterol nucleus, one molecular proportion only of hydrogen halide is split off and there is obtained in a surprising manner a new unsaturated mono-halogen ketone containing a sterol nucleus in which the carbon bond probably stands in conjugated position to the ketone group.

It could not be anticipated that the very labile dihalides of the unsaturated ketones containing the sterol nucleus can be converted into unsaturated monohalogen ketones without appreciable resinification and without formation of mixed unsaturated compounds having one or two double bonds.

For removal of the hydrogen halide there may be used in particular a tertiary base, such as pyridine or dimethylaniline, an alkali salt of an organic acid, such as an alkali acetate or the like.

Thus, from cholestenone-dibromide one obtained the 6-bromo-$\Delta^{4,5}$-cholestenone of the Formula I hereafter, and in like manner from dibromo-$\Delta^{5,6}$-dehydro-androsterone the 6-bromo-$\Delta^{4,5}$-androstene-dione of the Formula II. The latter compound may be produced also from 6-bromo-$\Delta^{5,6}$-androstene-diol-(3, 17) by oxidizing both the hydroxyl groups to ketonic groups. From derivatives of androstene-diol substituted in the 17-position by, for example, ester-, ether- or alkyl groups, for instance its 17-benzoic acid ester, there are obtained the corresponding derivatives of 6-bromo-testosterone of the Formula III:—

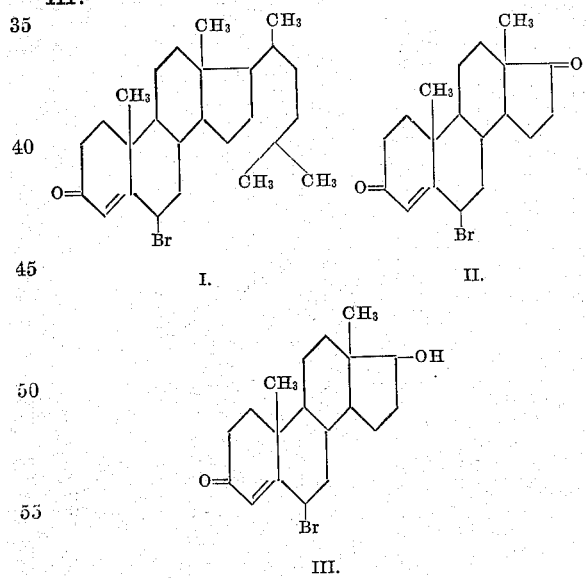

Instead of the dibromide of the parent material the dichloride or di-iodide may be used.

These new compounds are of value in therapeutics or as intermediate compounds for making other therapeutic products.

The following examples illustrate the invention:—

Example 1

A solution of 2 grams of potassium acetate in 20 cc. of water is added to a benzene solution of 4 grams of $\Delta^{5,6}$-cholestenone-dibromide, the latter forming the top layer, and the whole is boiled under reflux. After boiling for 6 hours the action is interrupted and the benzene solution, which is only feebly colored, is dried with calcium chloride and evaporated to a syrup. The latter is dissolved in 15–20 cc. of acetone and at room temperature so much water is added that there is no remaining turbidity. The solution is subjected for a day to a temperature of —15° C. and the crystalline magma thus produced is quickly filtered by suction. The crystals are dissolved with aid of heat in a little ethyl alcohol. On cooling, a yellow oil deposits and from the supernatant alcoholic solution a portion of the monobromide crystallizes. The crystals are separated. By decanting the warm alcoholic solution from the oil by several times extracting the oil with boiling alcohol, further quantities of the monobromide are obtained. The purified alcoholic mother liquors are again evaporated to a syrup in a vacuum, again dissolved in acetone and crystallization is produced in the cold as described above. The crude 6-bromo-$\Delta^{4,5}$-cholestenone is recrystallized several times from alcohol. When pure it is in the form of beautiful white needles of melting point 126–127° C. (corrected).

In analogous manner the 6-chloro-$\Delta^{4,5}$-cholestenone may for example also be obtained.

Example 2

4.3 grams of $\Delta^{5,6}$-cholestenone-dibromide are mixed with 45 cc. of benzene and 0.63 grams of pyridine, and the mixture is heated for 2 hours on the water-bath in a reflux apparatus. After some time pyridine hydrobromide begins to separate. The mass is then acidified with acetic acid and the benzene solution is washed and dried and worked up as described in Example 1. The same monobromide compound is obtained.

Example 3

0.5 gram of androstenedione-dibromide are dissolved in 10 cc. of benzene and a solution of 0.3 gram of potassium acetate in 3 cc. of water is added thereto to form a lower layer, and the whole is boiled for 3 hours. The benzene solution is then separated, dried and evaporated in a vacuum to a syrupy consistence. The crystals of the 6-bromo-$\Delta^{4,5}$-androstene-dione obtained by adding alcohol to the syrup are filtered by suction, washed with methyl alcohol and recrystallized from ethyl acetate. The 6-bromo-$\Delta^{4,5}$-androstene-dione has the form of white crystals of melting point 170–171° C. (corrected) after decomposition.

As agents splitting off hydrogen halide there may also be used for example pyridine or dimethylaniline.

According to the same method there may also be produced for example the 6-bromo-testosterones as well as esters of these compounds, such as for example the propionates and butyrates, or ethers thereof, such as for example methyl and ethyl ether.

The parent materials may also be substituted in 17-position by alkyl groups.

What I claim is:—

1. The 3-keto-6-halogeno-$\Delta^{4,5}$ unsaturated compounds containing the sterol nucleus.

2. The 3-keto-6-bromo-$\Delta^{4,5}$ unsaturated compounds containing the sterol nucleus.

3. The 3-keto-6-bromo-$\Delta^{4,5}$-androstene compound of the formula

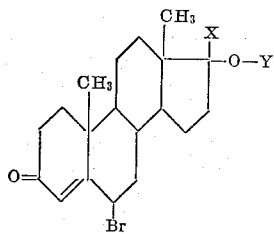

wherein X is a member of the group consisting of hydrogen and alkyl and Y is a member of the group consisting of hydrogen, alkyl and acyl radicals.

4. The 6-bromo-$\Delta^{4,5}$-androstene-dione of the formula

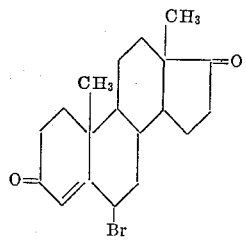

melting at 170–171° C.

LEOPOLD RUZICKA.